Figure 1:
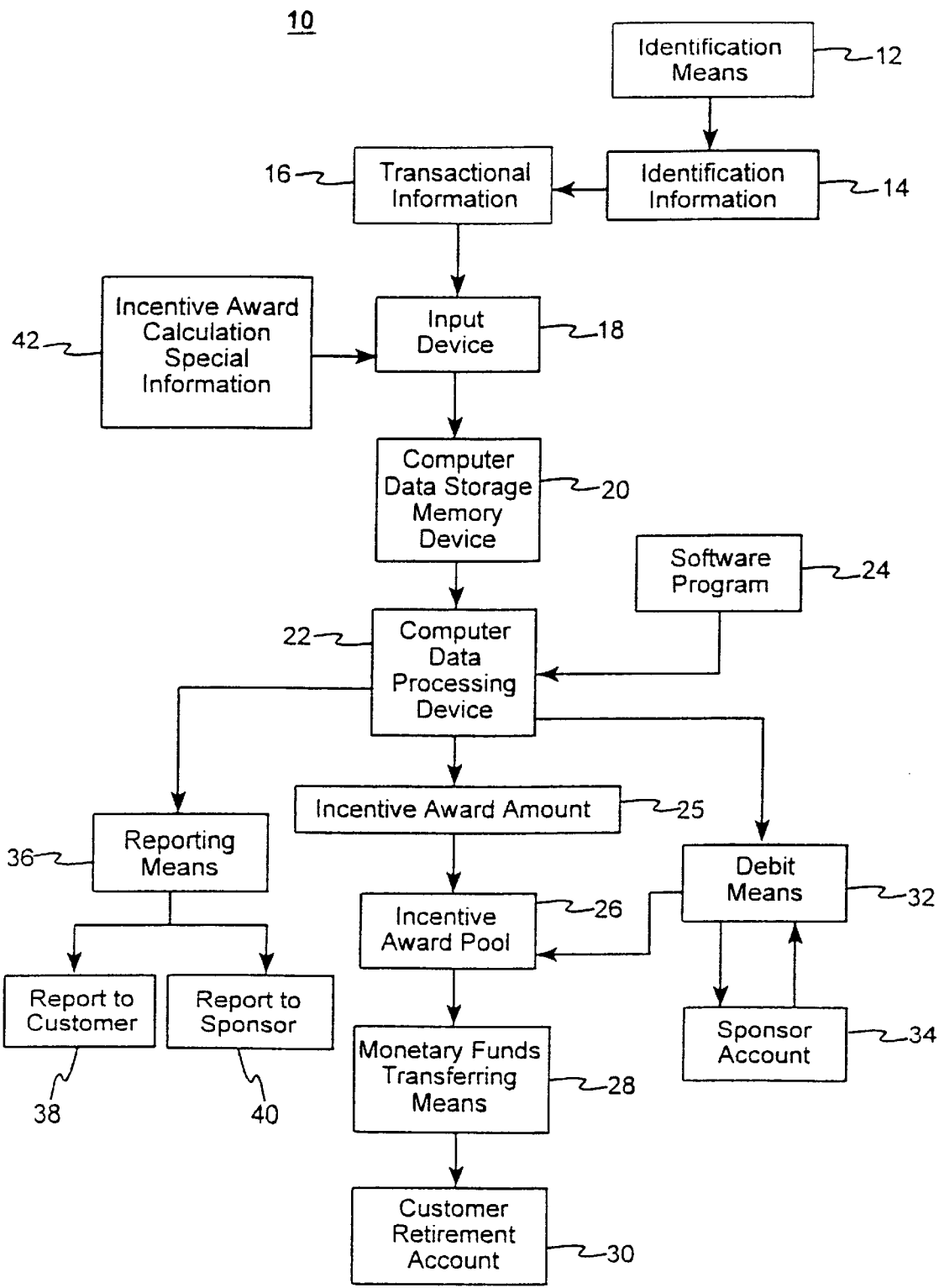

United States Patent [19] [11] Patent Number: 5,991,736
Ferguson et al. [45] Date of Patent: Nov. 23, 1999

[54] PATRONAGE INCENTIVE AWARD SYSTEM INCORPORATING RETIREMENT ACCOUNTS AND METHOD THEREOF

[76] Inventors: Henry Ferguson, 421 Glenview Dr.; Clayton T. Ferguson, 2813 Knights Ct., both of Lower Burrell, Pa. 15068

[21] Appl. No.: 08/806,166

[22] Filed: Feb. 26, 1997

[51] Int. Cl.⁶ .................................................. G06F 17/60
[52] U.S. Cl. .............................. 705/14; 705/35; 705/39
[58] Field of Search ............................. 705/14.1, 39, 35; 902/25, 37, 41; 235/380

[56] References Cited

U.S. PATENT DOCUMENTS

| | | |
|---|---|---|
| 4,750,119 | 6/1988 | Cohen et al. . |
| 4,941,090 | 7/1990 | McCarthy . |
| 5,025,372 | 6/1991 | Burton et al. . |
| 5,056,019 | 10/1991 | Schultz et al. . |
| 5,083,270 | 1/1992 | Gross et al. . |
| 5,083,782 | 1/1992 | Nilssen . |
| 5,117,355 | 5/1992 | McCarthy . |
| 5,193,056 | 3/1993 | Boes . |
| 5,202,826 | 4/1993 | McCarthy . |
| 5,262,942 | 11/1993 | Earle . |
| 5,297,026 | 3/1994 | Hoffman ................................. 705/14 |
| 5,441,309 | 8/1995 | D'Alessio et al. . |
| 5,453,601 | 9/1995 | Rosen . |
| 5,513,102 | 4/1996 | Auriemma . |
| 5,537,314 | 7/1996 | Kanter . |
| 5,577,915 | 11/1996 | Feldman . |
| 5,734,838 | 3/1998 | Robinson et al. ..................... 395/214 |
| 5,787,404 | 7/1998 | Fernandez-Holmann ............. 705/35 |

OTHER PUBLICATIONS

Mannix, "The Rebate Revolution" U.S. News and World Report v. 14 n. 21 p. 74(3), May 1993.
Stouffer, "Investors Here Like CDs: IRA Funds Up Despite Low Rates"Pittsburgh Business Times and Journal, v. 5, n. 29 p. 1, Mar. 1986.
MacDonald, "Bonuses Key Weapon in RRSP Battle: Creative Marketing Aimedat Keeping Existing Business" Financial Post Financial Post, Weekly Ed. p. 29 Jan. 1990.
G. Colter "Smart Money Hesitates Before Fidelity Offer; New Credit Card Helps Users Purchase Firm's Funds; Buyer Beware, Some Say, " The Wall Street Journal, May 27, 1994, Section B, p. 4G.

*Primary Examiner*—Melanie A. Kemper
*Attorney, Agent, or Firm*—Sweeney Metz Fox McGrann & Schermer L.L.C.; Leland P. Schermer; Thomas Lizzi

[57] ABSTRACT

Embodiments are disclosed of a patronage incentive system in which a monetary award is made to a customer's retirement account as incentive for the customer to participate in a transaction with the sponsor for the sponsor's goods or services. The system includes a means for identifying the customer, a means for inputting the identification information and other information about the transaction into a computer data storage, a computer data processing device which uses a software program along with the transactional information to calculate an incentive award amount a means for transferring the monetary funds equal to the incentive award amount from an incentive award pool to the customer's retirement account, and a means of reporting the incentive award amount to the customer and to the sponsor. Embodiments of a method of conducting a patronage incentive system of the present invention are also disclosed comprising the steps of inputting transactional information into a computer data storage device, calculating the incentive award amount through the use of a computer data processing device, transferring monetary funds equal to the incentive award amount from an incentive award pool to the customer's retirement account, and reporting the incentive award amount to the customer and to the sponsor.

18 Claims, 1 Drawing Sheet

PATRONAGE INCENTIVE AWARD SYSTEM INCORPORATING RETIREMENT ACCOUNTS AND METHOD THEREOF

BACKGROUND OF THE INVENTION a) Field of the Invention

The present invention relates to a patronage incentive award system incorporating monetary incentive awards made to a retirement account. More specifically, the present invention relates to a patronage incentive award system in which a computerized system calculates and transfers to a customer's retirement account a monetary incentive award for each transaction conducted with the sponsor of the incentive award. The present invention also relates to a method for operating a patronage incentive award system whereby a monetary incentive award is transferred to the customer's retirement account.

b) Description of the Related Art

Patronage incentive systems have long been used to provide added impetus for customers to enter into transactions with the sponsors who employ the incentive systems. Patronage incentive systems, like all incentive systems, endeavor to stimulate a targeted subject to engage in a type of behavior desired by the person employing the incentive system. In the case of patronage incentive systems, the targeted subject is a customer—either actual or potential—and the person employing the incentive system is the sponsor. The sponsor is usually a provider of goods or services who utilizes the patronage incentive system to stimulate the customer into engaging in transactions with the sponsor for those goods and services.

Patronage incentive systems, again like all incentive systems, seek to stimulate the subject to perform an act desired by the sponsor by providing the subject with the opportunity to obtain something that the subject wants to have. In other words, a patronage incentive system provides stimulus to a customer to enter into a transaction with the sponsor by giving the customer some type of an incentive award that the sponsor thinks the customer will want. Examples of incentive awards of prior art patronage incentive award systems include free merchandise, discounted prices, cash refunds or credits, and the opportunity to win prizes such as merchandise, services, or vacation trips. However, an incentive award is sometimes as simple as the opportunity to participate in a transaction with the sponsor which has features the customer may find beneficial to him.

One of the simplest forms that a patronage incentive system can take is that of the sponsor advertising to customers the possible benefits of entering into a transaction with the sponsor. Usually, the transaction is a sale of goods or services and the benefits advertised are the particular advantages of the goods or services that the sponsor would like to sell. The sponsor may also advertise the benefit of his price for the goods or services relative to the price his competitors would charge. Such advertisements are made by many means including newspapers, magazines, television, radio, billboards, mailers, and other forms of public or private communication. The amount of incentive provided by advertising is related to many factors including the benefits advertised, the persuasiveness of the sponsor's advertisements, the prominence of the advertisements, the media selected for advertisement, and the amount of money invested in the advertisements. A drawback to conventional advertising as a patronage incentive system is that the advertising must be paid for prior to any transactions realized from the advertising. Another drawback is that the advertising must be paid for whether or not the advertising produces any transactions at all.

Another type of patronage incentive system involves the sponsor issuing coupons which customers can use beneficially in a transaction with the sponsor. The coupon-based patronage incentive system often is used in conjunction with advertising. The coupons may allow the customer to pay a lower price for the good or service or to obtain additional merchandise or services. However, drawbacks of coupon-based patronage incentive systems include the fact that the management of the system requires the designing and issuance of the coupons as well as the collection, verification, redemption, handling, storage, and final disposal of the coupons. Another disadvantage is that redemption of the coupons at the time of the transaction can significantly prolong the time the transaction takes to occur thereby consuming valuable time of the sponsor, the customer, and other customers who are in line behind the customer who is redeeming the coupons. Another disadvantage is that the finding, cutting out, sorting, organizing, and carrying activities accompanying the redemption of coupons provide countervailing disincentives to the customer to participate in a coupon-based patronage incentive system.

Another type of patronage incentive program uses the award of merchandise selected from a catalogue as an incentive award to the customer to engage in transactions with the sponsor. In this type of patronage incentive system, the customer is awarded a number of points for a transaction. The number of points awarded may depend on the monetary value of the transaction. The number of points awarded may also depend upon the frequency of transactions the customer has with the sponsor or the time period in which the transactions are conducted. Various means have been used to keep track of and to validate the number of points accumulated by each customer. Examples of such tracking and validation means include stamps, stickers, tickets, and punch cards. However, catalogue merchandise-based patronage incentive systems have many drawbacks. Among these drawbacks are the need for the sponsor to select merchandise that will be awarded and to design, publish, and distribute catalogues. Other drawbacks include the need for the sponsor to obtain, warehouse, and distribute the incentive award merchandise, and to deal with faulty award merchandise, overstocked and understocked award merchandise conditions.

Another type of patronage incentive system involves the sponsor allowing the customer to participate in a game of chance to which the sponsor supplies the prize awards. Drawbacks of this type of incentive system include the need for the sponsor to design the rules of the games in accordance with applicable legal restrictions and to design, publish, and distribute the playing pieces of the game to the customers. Another drawback is that the sponsor must select the incentive award prizes and figure out a convenient way to award the incentive award prizes to the winners. Another further drawback is that the awarding of prizes may be required regardless of whether any transactions were made with the customer and regardless of the value of transactions that were in fact made. Other disadvantages include problems associated with the validation of winning game pieces, disputes over eligibility and winning, and problems related to the presentation of the incentive awards such as unavailability of or damage to the prizes before presentation occurs.

Still another type of patronage incentive system involves the sponsor awarding a credit to the customer that may be used by the customer toward later transactions with the sponsor. The amount of the credit awarded may depend on the monetary value of the transaction, the frequency of transactions, or other transactional characteristics such as the specific goods or services involved in the transaction. This type of patronage incentive system has the drawback that the customer is restricted to redeeming the credit award only as part of a transaction with that particular sponsor, thereby reducing the attractiveness of the incentive award to the customer.

In another type of patronage incentive system, the sponsor awards a flat cash payment to the customer when the customer attains certain goal that is related to transactions the customer has with the sponsor. A drawback to this type of patronage incentive system is that the cash award may be quickly spent leaving nothing to remind the customer of the incentive award or of the sponsor.

Some patronage incentive systems use trips to vacation spots as incentive awards. There are drawbacks to the use of vacation trips as incentive awards. One drawback is that the cost of vacation awards usually preclude the possibility of making such an award to each customer for each transaction with the sponsor. Another problem is the difficulty in selecting the location, duration, means of travel, and accommodations for the vacation trip.

From the above examples it is apparent that prior art patronage incentive systems tend to focus on providing a short term benefit to the customer as an incentive for the customer to patronize the sponsor of the patronage incentive system. However, customers also have long term needs. The fulfilment of a long term need, like the fulfilment of any need, can act as an incentive to encourage a customer to patronize a sponsor. One such long term need is the need the customer has to provide for his retirement security. Increased life expectancies along with predictions of the insolvency of the Social Security system in the near future have heightened the awareness in many people about the need to accumulate funds for their retirement years. Prior art patronage incentive systems have not utilized as an incentive the fulfilment of customers' long term need to provide for their retirement security. Thus, it is clear that what is lacking in the art is a patronage incentive system which, while overcoming many of the drawbacks of prior art patronage incentive systems, utilizes the fulfilment of a customer's long term need of providing for his retirement security as an incentive for the patronage of a sponsor.

BRIEF SUMMARY OF THE INVENTION

The present invention provides a novel patronage incentive system having a incentive award that addresses a customer's long term need to provide for his retirement security. In accordance with the principles of the present invention, a patronage incentive award system is disclosed in which a monetary incentive award for a customer's patronage of a sponsor is transferred to the customer's retirement account. The patronage incentive system of the present invention thereby provides the customer with an incentive award to patronize the sponsor that addresses the customer's long term need of providing for his retirement security.

A method of operation of a patronage incentive system of the present invention is also disclosed.

The present invention comprises a patronage incentive system which allows a monetary incentive award provided by the sponsor to be transferred to the customer's retirement account Some embodiments of the present invention permit the sponsor to varyingly control the amount of incentive that is to be awarded for each transaction. In some of these embodiments, the sponsor may adjust the amount of an incentive award to correspond to the frequency of the transactions the customer conducts with the sponsor. In some of these embodiments, the sponsor may have the incentive award depend on the monetary value of the goods or services involved in the transaction meeting threshold levels.

The present invention overcomes several of the drawbacks present in prior art patronage incentive systems. Although the present invention may be used in conjunction with advertising, the present invention overcomes the drawback, occasioned by the use of advertising alone, of the sponsor having to pay for the incentive award prior to the transaction with the customer and regardless of whether any such transaction actually occurs. The present invention overcomes many of the problems of coupon-based patronage incentive systems such as those associated with coupon design, issuance, distribution, collection, verification, redemption, handling, storage, and final distribution as well as the problem of prolonging the time to make the transaction. Further, the present invention eliminates the disincentive of coupon-based patronage incentive systems of the customer having to find, cut out, sort, and organize coupons. The present invention also overcomes the drawbacks of catalogue merchandise-based patronage incentive systems of the sponsor having to provide a catalogue and to acquire, stock, and distribute the award merchandise, as well as the problems with the sponsor having to deal with defective merchandise, overstocked or understocked award merchandise, and disputes over validation of winning. The present invention overcomes many of the problems with patronage incentive systems using games of chance such as the problems with designing rules that correspond to locally applicable laws, with the design, publishment, and distribution of playing pieces, with requirements of giving out prizes regardless of whether a transaction has occurred, and with disputes over eligibility, winning and the presentation of prizes which have become unavailable or damaged. The present invention also overcomes the drawback of patronage incentive systems that award credit for the sponsor's goods or services of the attractiveness of the award to the customer being diminished by the fact that the award can only be used to acquire additional goods or services from that particular sponsor. The present invention further overcomes the disadvantage of patronage incentive systems which utilize a flat cash award to the customer of the customer quickly spending the cash and then having nothing to remind him of the award or the sponsor inasmuch as the incentive award of the present invention is placed in a retirement account which by its very nature discourages quick spending of the monetary award.

A patronage incentive system of the present invention comprises an identification means which identifies a customer who participates in a transaction with a sponsor of the patronage incentive system. The identification means can be any tangible item capable of storing information, such as a plastic card with information recorded in a magnetic strip or in some other machine readable form, for example, a credit card or a credit card-like device. The identification means contains identification information describing the identity of the customer. The identification information may also include other information such as information describing the identity of the customer's retirement account. Such a patronage incentive system also comprises transactional information which in turn comprises identification information along with information which describes features of the transaction between the customer and the sponsor such as the dollar value of the transaction, the date of the transaction, the location of the transaction, or the identity of the sponsor. Such a patronage incentive system also includes a computer data storage memory device and at least one input device for inputting the transactional information into that computer data storage memory. Input devices may include an electronic card reader, a scanner, a computer keyboard or any other means known to one skilled in the art of inputting information into computer data storage memory devices. Such a patronage incentive system further comprises a software program and a computer data processing device for utilizing the software program. The computer data processing device may be any electronic computer such as personal computer or a work station computer or a main frame computer. The computer data processing device is in communication with the computer data storage memory device in which the transactional information is stored so that the computer data processing device can and does access and utilize the transactional information during the execution of the software program to calculate an incentive award amount that is to be awarded to the customer's retirement account for the transaction. Such a patronage incentive system also comprises an incentive award pool, such as a bank account, having monetary funds from which the monetary incentive award is to be paid out and a means to transfer a portion of the monetary funds of the incentive award pool equal to the incentive award amount from the incentive award pool to the customer's retirement account. The means for transferring a portion of the monetary funds from the incentive award pool to the customer's retirement account may be any means for transferring monetary funds between a first monetary account, a monetary store, or a monetary reserve and a second monetary account known to one skilled in the art. One such example is an electronic funds transfer system. A patronage incentive award system of the present invention further comprises a means for reporting the award amount to the customer and to the sponsor. This means of reporting may take a number of forms, including that of a mailed paper report or an electronic report transmitted via the Internet.

The present invention contemplates that the customer's retirement account may be any form of an account at a bank, brokerage house or an investment company which the customer utilizes for retirement savings and designates to the sponsor as being the account into which incentive awards are to be transferred. Preferably, the retirement account comprises at least one financial investment instrument, such as a mutual fund or an Individual Retirement Account ("IRA"). In an embodiment of the present invention wherein the customer is an individual person, the retirement account is most preferably an investment account that includes a plurality of financial instruments wherein at least one of the plurality of financial instruments is an IRA. In an embodiment of the present invention wherein the customer is an employer, the retirement account is most preferably an account from which the employer distributes monetary funds to other accounts which are maintained for the purpose of providing retirement benefits for the customer's employees. For example, Employer A as a customer, engages in a transaction with Supplier B who is a sponsor in a patronage incentive system of the present invention. As a result of the transaction, the patronage incentive system causes an incentive award amount X to be calculated and an incentive award of monetary funds equal to amount X to be transferred from the patronage award system's incentive award pool into Employer A's retirement account. Employer A then distributes the monetary funds from this retirement account into accounts which are maintained for the purpose of providing retirement benefits to Employer A's employees.

The present invention contemplates that the incentive awards will be paid out of an incentive award pool. In a preferred embodiment of the present invention, the incentive award is transferred by an electronic funds transfer system from the incentive award pool to the customer's retirement account. The incentive award pool may be maintained directly by a sponsor. Where multiple sponsors participate in the patronage incentive system of the present invention, the patronage incentive system may optionally include a means for debiting an account of the sponsor involved in the transaction for at least an amount equal to the incentive award which is being transferred to the customer's retirement account for that transaction.

The patronage incentive system of the present invention can be adapted for use by one or more sponsors to provide incentive to one or more customers to enter into transactions with the sponsor or sponsors. In its simplest form, the patronage incentive system of the present invention is adapted for use by a single sponsor to provide incentive to a single customer to enter into transactions with the sponsor. The patronage incentive system of the present invention may be adapted for use by a single sponsor to provide incentive to multiple customers. The patronage incentive system of the present invention may be adapted for use by multiple sponsors to provide incentive to one or more customers. For example, in one embodiment of the present invention, the patronage award system is operated by an administrator who coordinates the participation of a plurality of participating sponsors, each of whom engage in transactions with many customers.

The present invention also includes a method for conducting a patronage incentive system comprising the step of inputting into a computer data memory device information about a transaction between a customer and a sponsor of the patronage incentive system. The information to be input includes the transactional information described above. The method also comprises the step of calculating an incentive award amount for the transaction by using a computer data processing device such as one described above. The method further comprises the step of transferring monetary funds equal to the incentive award amount from an incentive award pool to the customer's retirement account. The method also comprises the step of reporting the incentive award amount to the customer and to the sponsor.

A method of the present invention may also include the step of using a credit card or some other device containing information about the customer to identify the customer. A method of the present invention may include the operation of a patronage incentive system wherein the customer's retirement account comprises at least one financial instrument such as stocks, bonds, a mutual fund, or an IRA . A method of the present invention may also comprise the step of debiting an account of the sponsor involved in the transaction for an amount at equal to at least the amount of the incentive award being transferred to the customer's retirement account A method of the present invention may include the step of the sponsor varyingly controlling the incentive award amount for the transaction. For example, by way of this step, a sponsor may control the incentive award amount based on the dollar value of the goods or services involved in the transaction or on the frequency of transactions the customer conducts with the sponsor. A method of the present invention may also include the use of an electronic funds transfer system to accomplish the step of transferring from an incentive award pool to the customer's retirement account monetary funds equal to the incentive award amount.

These and other features, aspects, and advantages of the present invention will become better understood with reference to the following description and appended claims.

DESCRIPTION

FIG. 1 depicts, in block diagram form, a preferred embodiment of a patronage incentive system of the present invention. In the preferred embodiment shown, a patronage incentive system 10 having the characteristics of the present invention has identification means 12 which is used to identify the customer who participates in a transaction with a sponsor. The identification means 12 contains identification information 14 which identifies the customer. The patronage incentive system 10 of this embodiment also includes information about the transaction. This information along with the identification information 14 together make up a body of information which is referred to herein as the transactional information 16. This preferred embodiment also includes a computer data storage memory device 20 as well as an input device 18 for inputting the transactional information 16 into the computer data storage memory device 20. Also included in this preferred embodiment is a computer data processing device 22 and a software program 24. The computer data processing device is in communication with the computer data storage memory device 20 in which the transactional information 16 is stored. The software program 24 is utilized by the computer data processing device 22 along with the transactional information 16 to calculate the incentive award amount 25 which is to be awarded to the customer for the transaction. This preferred embodiment also includes a incentive award pool 26 which contains monetary finds. Further included as part of this preferred embodiment is a retirement account 30 of the customer and a means of transferring 28 a portion of the monetary funds equal to the incentive award amount 25 from the incentive award pool 26 to the customer's retirement account 30. This preferred embodiment also includes a means for reporting 36 to the customer and to the sponsor who were involved in the transaction the incentive award amount 25 for the transaction. In this embodiment, the means of reporting 36 includes a first report 38 to the customer and a second report 40 to the sponsor. Also included in this preferred embodiment is a debit means 32 for debiting an account 34 of the sponsor for at least an amount equal to the incentive award amount 25 which is being transferred to the customer's retirement account 30 from the incentive award pool 26. This embodiment also includes a means for the sponsor to varyingly control the incentive award amount 25, such means comprising instructions included in the software program 24 and incentive award calculation special information 42. In this embodiment, the incentive award calculation special information 42 is provided by the sponsor and is input into the computer data storage memory device 20 by way of input device 18. The instructions in the software program 24 respond to the incentive award calculation special information 42 during the calculation of the incentive award amount 25 by the computer data processing device 22 to adapt the incentive award amount 25 according to the wishes of the sponsor.

In the operation of this preferred embodiment of the present invention, an identification means having identification information is used to identify the customer of the transaction. The identification information from the identification means along with information about the transaction are both part of the transactional information which is inputted into a computer data storage memory device. A computer data processing device that is in communication with the computer data storage memory device utilizes this transactional information along with a software program to calculate the award amount that is to be transferred to the customer's retirement account as an award to the customer for participating in the transaction with the sponsor. The expectation of having monetary funds equal to this award amount transferred into one's retirement account provides incentive to the customer to conduct the transaction with the sponsor. At any time prior to the calculation of the incentive award amount, the sponsor may elect to employ the means for varyingly controlling the incentive award amount. After the incentive award amount is calculated, monetary funds equal to the incentive award amount are in fact transferred from an incentive award pool to the customer's retirement account. Debit means are employed to debit an account of the sponsor for an amount equal to at least as much as the incentive award amount. Reporting means are utilized to report the incentive award to the customer and to the sponsor.

In the following description of elements of this preferred embodiment of the present invention, it is to be remembered that the particular examples presented for an element are for illustrative purposes only and not to be understood as being exhaustive listings of possible embodiments of the element.

The identification means can be any tangible item capable of storing information and readily transportable by a customer. For example, the identification means may be a plastic card with information recorded in a magnetic strip or in some other machine readable form, for example a credit card or a credit card-like device. Tangible items of storing information such as paper slips, checks, tickets or cards with printed information, metal tokens, holograms, and stickers may also be used as the identification means. In the most preferred embodiment, a credit card is used as the identification means.

The identification means contains identification information. The identification information is information describing the identity of the customer. The identification information may include other information such as information describing the identity of the customer's retirement account. In the most preferred embodiment, the identification information contained on the identification means includes an identification number which identifies the customer and is used by the system to identify customer's address, his retirement account, and the location of the retirement account.

The transactional information includes the identification information and information about the transaction between the customer and the sponsor. The information about the transaction may include information such as the dollar value of the transaction, the date of the transaction, the location of the transaction, and the identity of the sponsor. Information about the type or quantity of product or service involved in the transaction may also be included. In short, any information which the sponsor may consider to be important may be included as the information about the transaction and thereby be made part of the transactional information.

The computer data storage memory device which is included in the preferred embodiment for storing the transactional information may be of any type which is compatible for use with the particular computer data processing means used in practicing the embodiment. Such computer data storage memory device is well known to those who are skilled in the art of computer hardware and data storage and retrieval and includes, but is not limited to, magnetic storage media such as floppy disks, hard drives, and tape drives as well as CD-ROM devices and RAM and ROM memory devices that are part of or used in conjunction with electronic computers such as personal computers, work station computers, and main frame computers. The computer data storage memory device may also be comprised of a plurality of components wherein each component stores a portion of the transactional information and each component is itself a type of computer data storage memory device such as was just described.

An input device for inputting the transactional information into a computer storage memory device is also included in the preferred embodiment. The input device may be an electronic card reader such as a credit card reader, a scanner, a computer keyboard or any other means known to one skilled in the art of inputting information into computer data storage memory devices. The input device may also consist of a plurality of components wherein each component is used to input a portion of the transactional information and each component is itself a type of input device such as was just described. In a most preferred embodiment wherein the identification means is a credit card, the input device would include a component which is a credit card reader located at the sight of the transaction which would input the identification information contained on the credit card into a computer data storage memory device.

The software program may be any software program that is compatible with the computer data processing device so long as the software program is capable of causing the computer data processing device to calculate an award amount from the transactional information. Such a software program is well within the knowledge of one skilled in the art of computer programming. In the most preferred embodiment, the software program also includes instructions which, when executed by the computer data processing device, cause a portion of the monetary funds of the incentive award pool equal to the award amount to be transferred by an electronic fuid transfer system to customer's retirement account. Also in the most preferred embodiment, the software program further includes instructions which, when executed by the computer data processing device, cause reports to be issued to the customer and to the sponsor telling of the amount of the incentive award transferred to the customer's retirement account along with the portions of the transactional information and other information desired by the sponsor to be included in the report. Further, in the most preferred embodiment, the software program also contains instructions which, when executed by the computer data processing device, cause an account of the sponsor who was a party to the transaction to be debited by an amount equal to at least as much as the award amount transferred from the incentive award pool to the customer's retirement account.

The computer data processing device which utilizes the software program may be any type of electronic computer known to one skilled in the art of computers such as a personal computer or a work station computer or a main frame computer. The computer data processing device is in communication with the computer data storage memory device wherein the transactional information is stored so that the computer data processing device can and does utilize the transactional information and the software program to calculate the incentive award amount that is to be awarded to the customer's retirement account for the transaction. In the most preferred embodiment the computer data processing device is also in communication with or is part of an electronic funds transfer system and the software program includes instructions which, when executed by the computer data processing device, cause a portion of the monetary funds of the incentive award pool equal to the award amount to be transferred by the electronic funds transfer system to the customer's retirement account. Also in the most preferred embodiment, the computer data processing device is in communication with an output device such as a modem or a printer and the software program includes instructions which, when executed by the computer data processing device, causes reports to be issued to the customer and to the sponsor telling of the amount of the incentive award transferred to the customer's retirement account along with the portions of the transactional information and other information desired by the sponsor to be included in the report. Further, in the most preferred embodiment, the computer data processing device is in communication with an electronic funds transfer system and the software program also contains instructions which, when executed by the computer data processing device, cause an account of the sponsor, who was a party to the transaction, to be debited by an amount equal to at least as much as the award amount transferred from the incentive award pool to the customer's retirement account.

The incentive award pool is an account that contains monetary funds from which the incentive award may be paid to a customer's retirement account. The incentive award pool may be any type of an account known to one skilled in the art of banking or investing. The incentive award pool may also be a store or other reserve of monetary funds kept by a sponsor or sponsors for the purpose of paying out incentive awards to a customer's retirement account. The incentive award pool may also be comprised of a plurality of accounts or reserves or stores of monetary funds. In the most preferred embodiment, the incentive award pool is a bank account which is accessible by an electronic funds transfer system so that monetary funds may be transferred directly from the incentive award pool to a customer's retirement account and monetary funds may be transferred into the incentive award pool from a sponsor's account.

The means for transferring a portion of the monetary funds equal to the incentive award amount from the incentive award pool to the customer's retirement account may be any means for transferring monetary funds between a first monetary account, a monetary store, or a monetary reserve and a second monetary account known to one skilled in the art of monetary transfers. Any of the means of transferring monetary funds used in commerce, banking, or investment are within the contemplation of the preferred embodiment of the present invention. For example, in the most preferred embodiment, the means for transferring is an electronic funds transfer system. The means for transferring may also consist of a physical transference of monetary funds from the incentive award pool into the customer's retirement account.

The means for reporting the incentive award amount to the customer and to the sponsor may be any type of reporting means in use in commerce, banking, or investment and known to one skilled in any of these arts. For example, the means for reporting may be paper reports, stating the incentive award amount, mailed to the customer and to the sponsor. The means for reporting may be a telephonic communication of the incentive award amount to the customer and to the sponsor. The means for reporting may be an electronic communication stating the incentive award amount sent to the customer and to the sponsor over such means as the Internet. The means for reporting may consist of a plurality of components wherein each component is itself a means of reporting such as was just described and one component is employed to communicate the incentive award amount to the customer and another component is used to communicate the incentive award amount to the sponsor. In the most preferred embodiment, the means of reporting the incentive award amount to the customer and to the sponsor is a paper report, issued monthly by mail, of the account statement type commonly employed by banks to report account activity to the account holders. In the most preferred embodiment, the means of reporting also includes portions of the transactional information and other information desired by the sponsor to be included in the report. Also, in the most preferred embodiment, the means of reporting also includes a paper report given to the customer which states a summary of all the incentive awards which he has received over time from participating in the patronage incentive award system. Further, in the most preferred embodiment, the means of reporting also includes information to the sponsor about the amount that has been debited from his account or that he is to pay back into the incentive award pool.

The retirement account of the customer may be any form of an account at a bank, brokerage house or an investment company which the customer utilizes for retirement savings and designates to the sponsor as being the account into which incentive awards are to be transferred. Each customer that participates in the patronage incentive system has his own retirement account. Preferably, the customer's retirement account comprises at least one financial investment instrument such as stocks, bonds, a mutual fund, or an IRA. In the most preferred embodiment, a customer's retirement account is an investment account which includes a plurality of financial instruments wherein at least one of the financial instruments is an IRA.

A patronage incentive system of the present invention may be adapted for the participation of one or more sponsors and one or more customers. The present invention contemplates embodiments of the preferred patronage incentive system to be employed by as few as one sponsor for the purpose of providing one or more customers with incentive to conduct transactions with the sponsor as well as embodiments wherein a plurality of sponsors employ the patronage incentive system to provide incentive to one or more customers to conduct transactions with one or more of those sponsors.

Where multiple sponsors participate in the patronage incentive system of the present invention, the most preferred embodiment of a patronage incentive system includes a means for debiting an account of the sponsor involved in the transaction for at least an amount equal to the incentive award which is being transferred to the customer's retirement account for that transaction. A means for debiting the account of the sponsor involved in the transaction is also most preferably included in embodiments of the present invention which are adapted for the use of a single sponsor. At least part of the funds debited from the sponsor's account are transferred directly or indirectly into the incentive award pool. The means for debiting an account of the sponsor may be any means of account debiting that is known to one skilled in the arts of banking or investing. In the most preferred embodiment, the means for debiting comprises instructions included in a software program which, when executed by the computer data processing device which also calculates the incentive award amount, cause an account of the sponsor, who was a party to the transaction, to be debited by an electronic funds transfer system for an amount equal to at least as much as the award amount transferred from the incentive award pool to the customer's retirement account.

Also within the contemplation of a preferred embodiment of the present invention is the inclusion within the patronage incentive system of a means for a sponsor to varyingly control the amount of the incentive award amount. Though all embodiments of the present invention include the calculation of an incentive award amount, the further inclusion of a means for varyingly controlling the incentive award amount gives a sponsor greater control to tailor the amount of the incentive award amount according to the amount of incentive he wants to provide to the customer for a particular transaction. In the most preferred embodiment, the means for control are instructions in the software program which respond to incentive award calculation special information provided by the sponsor to the computer data processing device during the execution of the software program while the incentive award amount is being calculated. The incentive award amount calculation special information may include information that causes the incentive award amount to be equal to a certain percentage of the monetary value of the goods or services that are involved in the transaction between the customer and the sponsor. The incentive award amount calculation special information may include information that causes the incentive award amount to be related to threshold levels of the monetary value of the goods or services that are involved in the transaction. The incentive award amount calculation special information may include information that causes the incentive award amount to be related to threshold levels of the number or frequency of transactions which the customer has transacted with the sponsor. Though information similar to the incentive award amount calculation special information may be also employed by an embodiment which does not include a means for varyingly controlling the incentive award amount, the inclusion of such a means for varyingly controlling the incentive award amount allows the sponsor to adjust the amount of incentive that is to be awarded for each transaction to which he is a party. In embodiments of the present invention which are adapted to the participation of a plurality of sponsors, the most preferred of these embodiments include the use of a means for varyingly controlling the incentive award amount where the means for controlling are instructions in the software program which respond to incentive award calculation special information provided by the sponsor involved in the transaction to the computer data processing device during the execution of the software program while the incentive award amount is being calculated.

The present invention also includes a method for conducting a patronage incentive system comprising the step of inputting into a computer data storage memory device information about a transaction between a customer and a sponsor of the patronage incentive system. The information to be input includes the transactional information described above. The method also comprises the step of calculating an incentive award amount for the transaction by using a computer data processing device of a type described above. The method further comprises a step of transferring monetary funds equal to the incentive award amount from an incentive award pool to the customer's retirement account. The method also comprises a step of reporting the incentive award amount to the customer and to the sponsor.

A preferred embodiment of the method for conducting a patronage incentive system includes the employment of the elements already described herein for embodiments of the patronage incentive system of the present invention. In this embodiment of the method of the present invention, the step of inputting into a computer data memory device information about a transaction between a customer and a sponsor comprises the sponsor inputting the transactional information using the input means described previously. Alternatively, the customer may input a portion of the transactional information, for example the identification information, and the sponsor input the balance of the transactional information. The transactional information is input into a computer data storage memory device such as was herein previously described. In the most preferred embodiment, a credit card is used as the identification means and the identification information portion of the transactional information is input by either the sponsor or the customer using a credit card reader to input the identification information from the credit card.

In the preferred embodiment, the step of calculating an incentive award amount by using a computer data processing device is carried out by utilizing a software program and a computer data processing device in communication with the computer data memory device which stores the transactional information where each of these items is as was herein previously described. Also in this embodiment, the step of transferring monetary funds equal to the incentive award amount from an incentive award pool to the customer's retirement account comprises the use of an incentive award pool, a customer's retirement account, and a means for transferring a portion of the monetary funds of the incentive award pool from the incentive award pool to the customer's retirement account where each of these items is as was herein previously described. In the most preferred embodiment, the incentive award pool is a bank account which is accessible by an electronic funds transfer system and the monetary funds are transferred directly from the incentive award pool to the customer's retirement account. In preferred embodiments, the customer's retirement account comprises at least one financial instrument. Also in preferred embodiments, the customer's retirement account comprises at least one IRA. In the most preferred embodiment, the customer's retirement account comprises a plurality of investment instruments including at least one IRA.

In the preferred embodiment, the step of reporting the incentive award amount to the customer and to the sponsor is accomplished by using the means of reporting as was herein previously described. For example, the step of reporting the incentive award amount may be accomplished by the mailing to the customer and to the sponsor paper reports stating the incentive award amount In the most preferred embodiment, the step of reporting is accomplished by the mailing to the customer and to the sponsor, on a monthly basis, of paper reports of the account statement type commonly employed by banks to report account activity. In the most preferred embodiment, the means of reporting also includes portions of the transactional information and other information, such as promotional advertising, desired by the sponsor to be included in the report. Also, in the most preferred embodiment, the paper report mailed to the customer includes a summary report stating for the customer a summary of all the incentive awards which he has received over time from participating in the patronage incentive award system. Further, in the most preferred embodiment, the paper report mailed to the sponsor includes information about the amount that has been debited from the sponsor's account or that the sponsor is to pay back into the incentive award pool.

Embodiments of the method of the present invention may include participation by one or more sponsors and by one or more customers. In the most preferred embodiment, the method includes the participation by a plurality of sponsors and a plurality of customers.

A preferred embodiment of the method of the present invention also comprises the step of debiting an account of the sponsor for an amount which is at least equal to the incentive award amount for the transaction transferred from the incentive award pool to the customer's retirement account. The step of debiting an account of the sponsor may be accomplished by any method of account debiting known to one skilled in the arts of banking or investing. In the most preferred embodiment, the debiting step is accomplished by including in a software program instructions which, when executed by the computer data processing device which also calculates the incentive award amount, cause an account of the sponsor, who was a party to the transaction, to be debited by an electronic funds transfer system for an amount equal to at least as much as the award amount transferred from the incentive award pool to the customer's retirement account.

A preferred embodiment of the method of the present invention comprises further the step of the sponsor, who participates in the transaction with the customer, varyingly controlling the incentive award amount. This step is accomplished by the use of any of the means for a sponsor to varyingly control the amount of the incentive award amount as was herein previously described. Though all embodiments of the method of the present invention include a step of calculating an incentive award amount, the further inclusion of a step of the sponsor varyingly controlling the incentive award amount gives the sponsor greater control to adjust the incentive award amount according to the amount of incentive he wants to provide to the customer for a particular transaction. In the most preferred embodiment, the step of the sponsor varyingly controlling the incentive award amount is accomplished by employing instructions in the software program which respond to incentive award calculation special information provided by the sponsor to the computer data processing device during the execution of the software program while the incentive award amount is being calculated. The incentive award amount calculation special information may include information that causes the incentive award amount is to be equal to a certain percentage of the monetary value of the goods or services that are involved in the transaction between the customer and the sponsor. The incentive award amount calculation special information may include information that causes the incentive award amount to be related to threshold levels of the monetary value of the goods or services that are involved in the transaction. The incentive award amount calculation special information may include information that causes the incentive award amount to be related to threshold levels of the number or frequency of transactions which the customer has transacted with the sponsor. Though information similar to the incentive award amount calculation special information may be also employed by an embodiment which does not include a step of the sponsor varyingly controlling the incentive award amount, the inclusion of a step for varyingly controlling the incentive award amount allows the sponsor to adjust the incentive award amount that is to be awarded for each transaction to which the sponsor is a party based on the amount of incentive he wants to provide to the customer to participate in the transaction. In embodiments of the present invention which are adapted to the participation of a plurality of sponsors, the most preferred of these embodiments include the use of a step of each sponsor of varyingly controlling the incentive award amount for each transaction accomplished by the use of instructions in the software program which respond to incentive award calculation special information provided by the sponsor involved in the transaction to the computer data processing device during the execution of the software program while the incentive award amount is being calculated.

The most preferred embodiment of the method of the present invention includes the step of using a credit card to identify the customer who participates in the transaction. In other words, in this embodiment, in this step, a credit card is used by the customer as the identification means as was herein previously described.

The present invention, both the patronage incentive system and the method thereof, may be used by each participating sponsor to provide incentive to one or more customers to enter into transactions with the sponsor for the sponsor's goods or services. The present invention provides the advantage over the prior art of utilizing an award addressed to fulfilling a portion of a customer's need to provide for his long term retirement security as an incentive for the customer to enter into a transaction with the sponsor for the sponsor's goods or services. The present invention is novel in providing this incentive award in the form of a monetary award made directly to the customer's retirement account.

In addition to providing these advantages, the present invention overcomes several of the drawbacks present in prior art patronage incentive systems described herein.

While preferred embodiments of the present invention are described herein, it is to be distinctly understood that the present invention is not limited thereto but may be otherwise embodied and practiced within the scope of the following claims.

We claim:

1. A patronage incentive award system for promoting a customer to enter into a transaction with a sponsor for goods or services, said patronage incentive award system comprising:
   (a) an identification means for identifying a customer who participates in a transaction with a sponsor of an incentive award system, said transaction involving goods or services of said sponsor, said identification means having identification information about said customer, and said customer having a retirement account;
   (b) transactional information including said identification information;
   (c) a computer data storage memory device for storing said transactional information and an input device for inputting said transactional information into said storage memory device;
   (d) a software program for determining an incentive award amount;
   (e) a computer data processing device for utilizing said software program, said computer data processing device being in communication with said computer data storage memory device;
   (f) an incentive award pool having monetary funds;
   (g) a means for transferring a portion of said monetary funds from said incentive award pool to said retirement account; and
   (h) a means for reporting said incentive award amount to said customer and to said sponsor,
wherein said customer is an employer having at least one employee and said retirement account is an account from which said customer distributes monetary funds to at least one account maintained for the retirement benefit of said at least one employee.

2. A patronage incentive award system as described in claim 1, wherein said retirement account comprises at least one financial investment instrument.

3. A patronage incentive award system as described in claim 2, wherein said retirement account comprises at least one IRA account.

4. A patronage incentive award system as described in claim 1, wherein said identification means comprises a credit card.

5. A patronage incentive award system as described in claim 1, wherein said means for transferring a portion of said monetary funds from said incentive award pool to said retirement account of said customer comprises an electronic transfer means for transferring a portion of said monetary funds from said incentive award pool to said retirement account of said customer.

6. A patronage incentive award system as described in claim 1 further comprising a means for debiting an account of said sponsor for an amount equal to at least said incentive award amount.

7. A patronage incentive award system as described in claim 1, wherein said incentive award system accommodates participation of a plurality of sponsors.

8. A patronage incentive award system as described in claim 1, wherein said incentive award system accommodates participation of a plurality of customers.

9. A patronage incentive award system as described in claim 7, wherein said incentive award system accommodates participation of a plurality of customers.

10. A patronage incentive award system as described in claim 1, further comprising a means for varyingly controlling said incentive award amount.

11. A patronage incentive award system as described in claim 1, wherein said transactional information further comprises incentive award calculation special information.

12. A method of operating a patronage incentive award system for promoting a customer to enter into a transaction with a sponsor for goods or services, said method comprising the steps of:
   (a) inputting into a computer data memory device information about a transaction between a customer and a sponsor of an incentive award system, said transaction involving goods or services of said sponsor;
   (b) calculating an incentive award amount by using a computer data processing device;
   (c) transferring from an incentive award pool having monetary funds to a retirement account of said customer a portion of said monetary funds equal to said incentive award amount; and
   (d) reporting said incentive award amount to said customer and to said sponsor;
wherein said customer is an employer having at least one employee and said retirement account is an account from which said employer distributes monetary funds to at least one account maintained for the purpose of providing retirement benefits to said at least one employee.

13. The method of operating a patronage incentive award system described in claim 12, wherein said retirement account comprises at least one financial instrument.

14. The method of operating a patronage incentive award system described in claim 13, wherein said retirement account comprises at least one IRA account.

15. The method of operating a patronage incentive award system described in claim 12, wherein the step of transferring from an incentive award pool having monetary funds to a retirement account of said customer comprises electronically transferring said monetary funds.

16. The method of operating a patronage incentive award system described in claim 12, further comprising the step of debiting an account of said sponsor for an amount equal to at least said incentive award amount.

17. The method of operating a patronage incentive award system described in claim 12, further comprising the step of varyingly controlling said incentive award amount.

18. The method of operating a patronage incentive award system described in claim 12, further comprising the step of using a credit card to identify said customer.

* * * * *